W. METTLER.
Wheel-Cultivator.

No. 43,123. Patented June 14. 1864.

Witnesses:

Inventor:
William Mettler
By his atty
J S Brown

UNITED STATES PATENT OFFICE.

WILLIAM METTLER, OF FRANKFORT, ILLINOIS.

IMPROVEMENT IN CULTIVATORS.

Specification forming part of Letters Patent No. 43,123, dated June 14, 1864.

*To all whom it may concern:*

Be it known that I, WILLIAM METTLER, of Frankfort, in the county of Will and State of Illinois, have invented a new and improved Corn and Grain Cultivator; and I do hereby declare that the following is a full and exact description thereof, reference being had to the accompanying drawings, making part of this specification—

Figure 1:
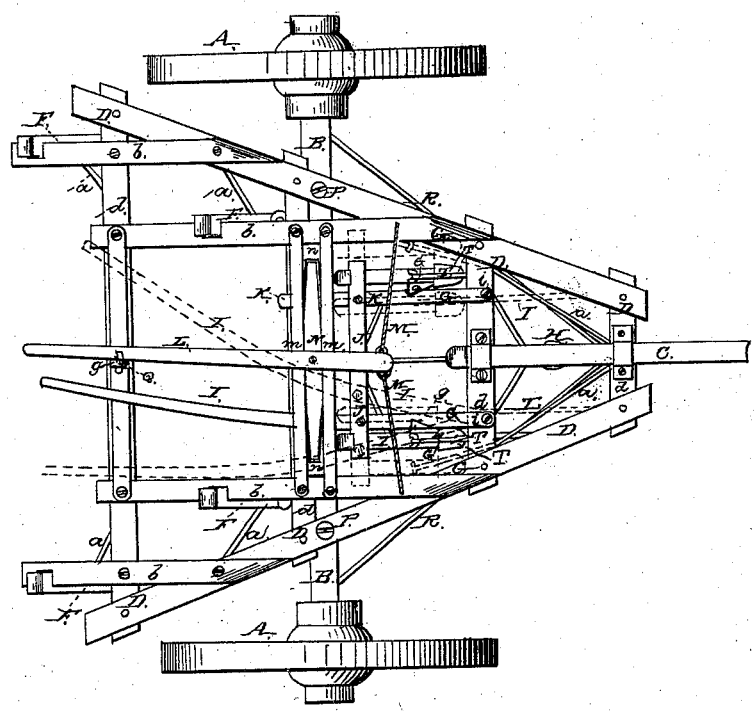
Figure 2:
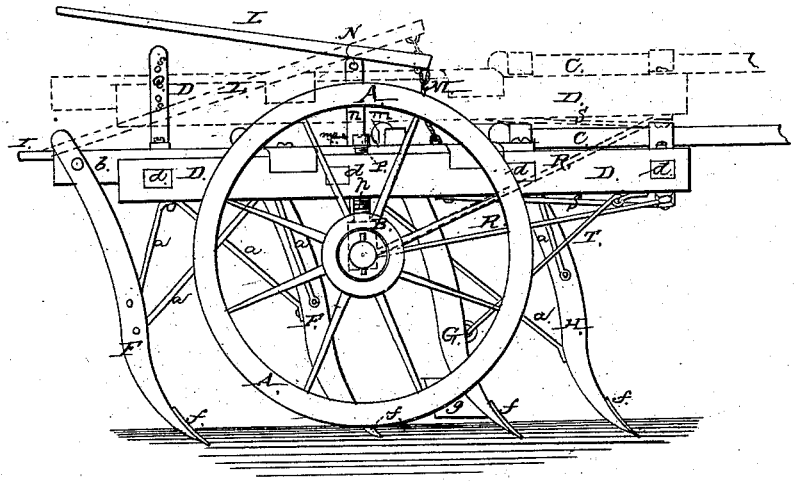

Figure 1 being a plan of the improved cultivator; Fig. 2, a side elevation thereof.

Like letters designate corresponding parts in both of the figures.

The uses for which my invention is principally designed are to cultivate between the rows of growing corn, to cover wheat and other grains sown among standing cornstalks, and to work ground over after fall plowing previous to planting corn or sowing grain.

The cultivator is mounted on a pair of wheels, A A, which are generally about three feet in diameter, the other parts of the implement being of dimensions proportionate thereto, according to the scale represented in the drawings. The axle B, somewhat raised above the axis of the wheels, supports the frame D of the implement. This frame is of nearly triangular form, the apex being in front, where the tongue C and the usual whiffletrees for drawing are attached. The frame has suitable cross-timbers *d d*, and also longitudinal pieces *b b* at the proper distances apart, which serve to attach the cultivating-teeth F F to. There are four of these freed teeth located at the rear part of the frame, two near the corners of the frame and the other two at certain intervals farther inward and farther forward, substantially as represented. Still farther forward and inward, so as to be in regular progression with the rear teeth, F F, are located two more teeth, G G, which are secured to a separately-movable frame composed of two side pieces, I K, and a cross-piece, J, the latter directly supporting the drill-teeth. The two side pieces, I K, are pivoted at *i i* to one of the cross-pieces *d d* of the frame D, and also at *j j* to the cross-bar J, so that forming a jointed parallelogram, freely varying its angles, the bar J may be readily moved laterally in the frame D. One of the side pieces, I, extends backward over the frame D, so as to form a handle to be controlled by the attendant of the implement. These two drill-teeth are particularly intended for cultivating close to rows of corn or other planted crop, and this lateral adjustment opposition enables the attendant to guide them by the hills which may be out of the direct line of the rows with perfect ease and certainty, and without injury to any of the growing crop. In addition to or in place of the ordinary drill-points, *f f*, there are mold-boards or shovels *g g* on these drill-teeth G G, projecting inward toward each other, so as to throw the soil inward to the rows of corn; and these shovels, by acting as drags and counterpoises to each other, cause the drill-teeth always to keep a central position in the implement when not controlled otherwise by the attendant. There may be, if desired, direct means of retaining these teeth in a central position. Such movable drill-teeth are not only valuable but indispensable to the proper cultivation of corn with this implement. Another peculiarity of the arrangement of these drill-teeth is that they are placed in front of the fixed drill-teeth F F of the implement. This position is important, since if they should follow the fixed cultivating-teeth they would leave deep furrows close to the hills of corn and cause the ground around them to dry too quickly, and consequently cause the corn to wither; but with the arrangement described the fixed drill-teeth following fill up the furrows and leave the ground comparatively even.

The shovels *g g* are not used in working in grain nor in cultivating fallow ground. For the latter purposes another cultivating-tooth, H, is located forward of the movable teeth G G and in the central draft-line of the implement. This of course is removed for cultivating among rows of corn.

All the drill-teeth are suitably braced with rods *a a*, secured to their shanks and to the frame.

The frame D and parts attached thereto are arranged so as to be balanced, or nearly so, upon the axle B, which supports it, so that the tongue neither bears heavily nor lifts upon the horses' necks. The frame has its bearings upon the axle B by means of two adjusting-screws, P P, substantially as represented, so that the height of the frame may be adjusted for gaging the depth of the drill-teeth in the ground. Vertical posts n n, secured to the axle and adjoining cross-strips m m, secured to the frame, serve to keep the latter in position upon the axle.

A cross-beam or rock-shaft, N, extends from one post n to the other at a suitable height above the frame D. To this rock-shaft, as a fulcrum, is attached a lever, I, so as to have a vertical movement; and chains M M connect the forward end of this lever with the frame D, substantially as shown in the drawings.

By depressing the rear end of the lever L the whole frame D, with the drills, is raised from the ground. A post or standard, Q, with pins s s, or their equivalent, is used to hold the lever L down, when desired, for turning at the ends of the rows or bouts and for transporting the implement over roads and fields. There are two brace-rods, R R, extending from the front side of the axle B to the front end of the frame D, which, together with the posts n n and guides m m, keep the frame D in a nearly-horizontal position, whether lifted above the axle or let down, without lifting or bearing variously on the horses' necks.

This implement is entirely effective for the purposes intended, and a boy twelve years old can attend it, with such ease and economy it may be worked.

I do not claim the mere lateral regulating movement of cultivator-teeth in the frame unconnected with stationary teeth; and I also disclaim teeth merely swinging laterally on pivots in any connection; but

What I claim as my invention, and desire to secure by Letters Patent, is—

1. The teeth G G, laterally movable bodily without angular change, in combination with fixed teeth F F, situated farther behind and outward than the said movable teeth, arranged and operating substantially as and for the purpose herein specified.

2. The combination of the guide-posts n n with the adjusting-screws P P, as herein set forth.

3. The combination of the hinged or jointed controlling-braces R R with the guide-posts n n and elevating device L M M, substantially as and for the purpose herein specified.

The above specification signed by me this 9th day of November, 1863.

WILLIAM METTLER.

Witnesses:
 D. L. HOBLEN,
 JENNY M. BROWNE.